United States Patent Office 2,738,309
Patented Mar. 13, 1956

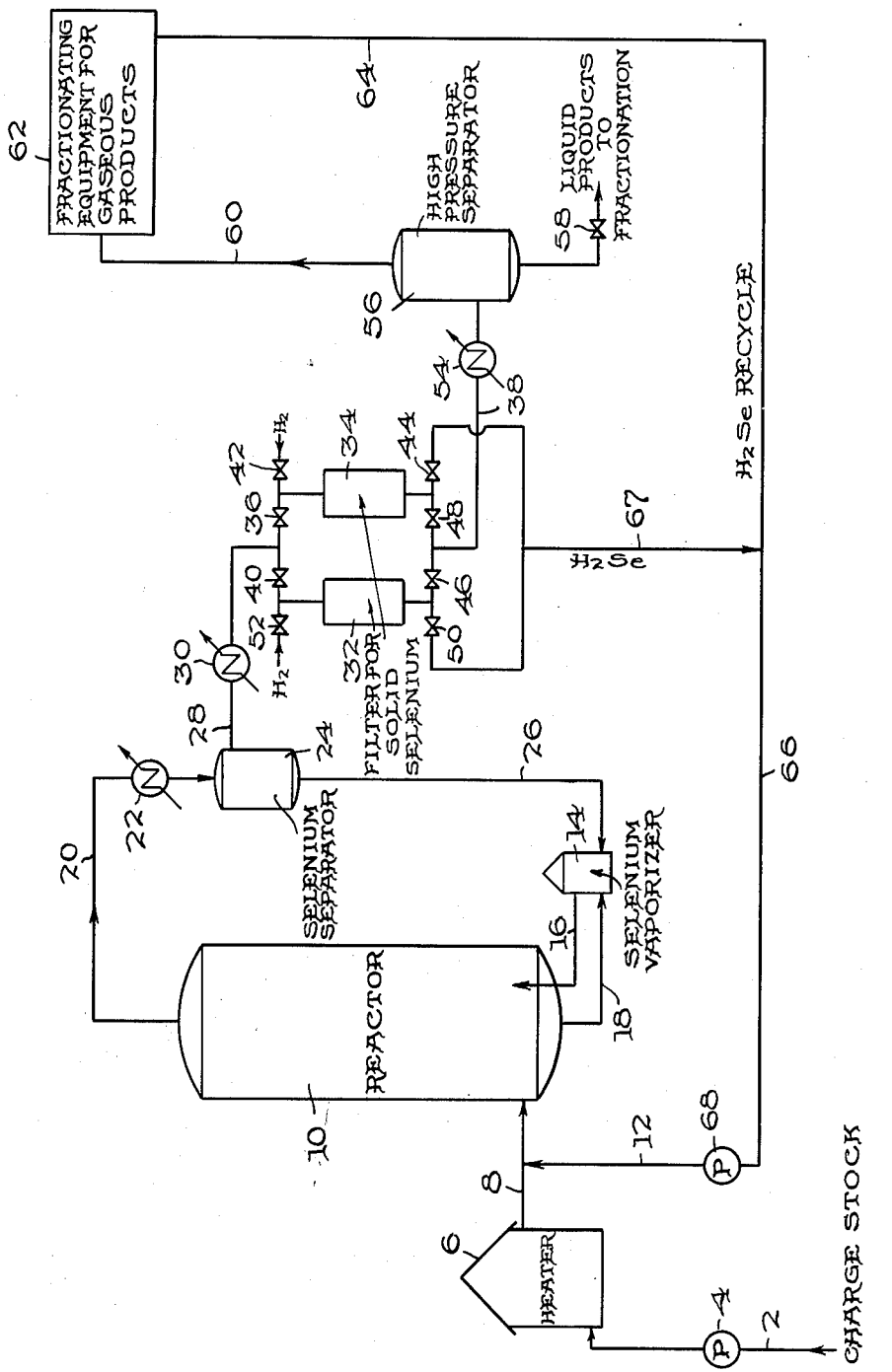

2,738,309
PROCESS FOR TREATMENT OF HYDROCARBONS

Alexander Lewis, Jr., Penn Township, Allegheny County, and William E. Hanson, Pittsburgh, Pa., assignors to Gulf Research & Development Company, Pittsburgh, Pa., a corporation of Delaware Application June 16, 1952, Serial No. 293,724

7 Claims. (Cl. 196—50)

This invention relates to improved procedure for treatment of hydrocarbons and especially for the dehydrogenation of hydrocarbons.

This invention has for its object to provide improved procedure for the treatment of hydrocarbons with selenium. Another object is to provide procedure for dehydrogenating hydrocarbons utilizing a combination of selenium and hydrogen selenide. Another object is to provide improved procedure for desulfurizing hydrocarbons. A further object is to provide procedure for treating hydrocarbons with selenium and hydrogen selenide and for recovering and reusing the selenium and hydrogen selenide. Other objects will appear hereinafter.

These and other objects are accomplished by our invention which includes treating a hydrocarbon with a mixture of vapors of selenium and hydrogen selenide at a temperature above about 300° C., separating selenium and hydrogen selenide from the reaction products and returning recovered selenium and hydrogen selenide for additional treatment of the hydrocarbon. When hydrocarbons are so treated which contain sulfur, it has been found that they are desulfurized, the sulfur being converted into hydrogen sulfide, and in accordance with this specific modification of our invention the hydrogen sulfide is removed from the hydrogen selenide before it is reused. Our invention also includes the additional step of recovering the selenium and hydrogen selenide for reuse by rapidly cooling the vaporous reaction products to a temperature above the melting point of selenium and at a temperature at which selenium is condensed as a liquid, returning the thus separated liquid selenium for reuse, then cooling the remaining vapors to a temperature below the melting point of selenium to facilitate removal of any residual selenium without causing condensation of substantial amounts of other components, passing the resultant mixture through a filter to remove the solid selenium, treating the filter with hydrogen at elevated temperature to remove the selenium in the form of hydrogen selenide and returning this hydrogen selenide plus the hydrogen selenide in the reaction products for reuse.

According to one modification of our invention naphthenes such as cyclohexane or alkyl naphthenes or materials containing them such as gasoline may be dehydrogenated to form aromatic hydrocarbons such as benzene in high yield by treating with a mixture of selenium and hydrogen selenide as the catalytic agent. In accordance with another modification of our invention paraffinic hydrocarbons such as heptane or hexane or gasoline containing such hydrocarbons may be converted in high yields into aromatic hydrocarbons such as benzene by treatment with the selenium and hydrogen selenide catalyst mixture. Olefins such as hexene, heptene, etc. may be similarly converted into aromatic hydrocarbons. On the other hand, higher boiling hydrocarbons such as kerosene and gas oil may be cracked and dehydrogenated by treatment with the mixture of selenium and hydrogen selenide as the sole catalytic agent.

Temperatures of between about 300° and 1000° C. in general may be employed in all of the above described operations although somewhat higher or lower temperatures can be used. When dehydrogenation or conversion into aromatic hydrocarbons is desired, temperatures in the lower portion of the range are preferable, i. e., temperatures of between about 350 and 650° C. Temperatures in the upper portion of the range mentioned will be found most useful when simultaneous dehydrogenation and cracking are desired. If the charge stock contains sulfur compounds these sulfur compounds will be converted to some extent into hydrogen sulfide at all of the temperatures mentioned.

It is advantageous to employ superatmospheric pressures for most of the operations mentioned above since this reduces the size of the equipment necessary for any given through-put per unit time. We may employ pressures up to about 100 atmospheres. Pressures of 10 to 20 atmospheres will generally be most desirable. It is to be understood, however, that atmospheric pressure or pressures somewhat below atmospheric may be employed if desired. The pressure should not be high enough to prevent maintenance of the reaction products and hydrogen selenide in the vapor form. In general it is preferable to have the hydrocarbons to be treated in vapor form at the reaction temperature and pressure.

The time of contact depends upon the amount of conversion desired and the amount of cracking that can be tolerated. A long time of contact will give high conversions but will increase the amount of cracking especially at high temperatures. Shorter contact periods decrease conversion and cracking. A time of contact between about two seconds and thirty minutes will generally be satisfactory.

The selenium and hydrogen selenide appear to act as true catalysts in our process, i. e., they are not consumed in the reaction as is explained below. The total amount of selenium, calculated as $Se_2$, preferably should vary between about 0.1 and 1 mol per mol of hydrocarbon treated. For dehydrogenation purposes it is preferable to have an amount of selenium corresponding to about one-third mol of $Se_2$ for every mol of hydrogen to be removed. The amounts mentioned include the selenium present as an element as well as the hydrogen selenide. The ratio of selenium to hydrogen selenide is not important since these two substances exist in equilibrium with hydrogen in the reaction zone and this is one of the advantages of our invention. However, in certain cases it may be desirable to increase the ratio of hydrogen selenide to hydrocarbon treated and this will necessarily alter the ratio of hydrogen selenide to selenium. This increase in hydrogen selenide to hydrocarbon (or selenium) may be brought about by introducing hydrogen or recycling a portion of the hydrogen formed in the reaction. This hydrogen will react with selenium to form excess hydrogen selenide. It is desirable to avoid as much as possible the presence of liquid selenium in contact with the hydrocarbon at reaction temperature since large amounts of liquid selenium cause excessive gas and carbon formation. This is illustrated by the data presented in the following table showing the results of bomb tests in which cyclohexane was dehydrogenated in the presence of varying amounts of selenium.

TABLE

| Run No. | Temp., °C. | Net Time, Hrs. | Wt. Se/ Wt. $C_6H_{12}$ | Estimated Mole Percent Cracking per Hour |
| --- | --- | --- | --- | --- |
| 1 | 425 | 8.17 | 3.8 | 1.1 |
| 2 | 425 | 5.47 | 2.8 | 0.63 |
| 3 | 425 | 8.17 | 2.8 | 0.58 |
| 4 | 425 | 8.17 | 1.9 | 0.26 |
| 5 | 425 | 11.33 | 1.3 | 0.28 |
| 6 | 425 | 16.83 | 0.04 | 0.07 |
| 7 | 440 | 3.00 | 1.9 | 0.86 |
| 8 | 440 | 5.00 | 1.3 | 0.65 |
| 9 | 440 | 8.00 | 1.3 | 0.64 |
| 10 | 440 | 3.00 | 0.95 | 0.45 |
| 11 | 440 | 6.00 | 0.00 | 0.47 |

The recovery of the selenium from the reaction products is accomplished by cooling to a temperature between about 220° and 400° C. The objective is to cool to a low enough temperature to prevent formation of selenium from the hydrogen selenide and to maintain the condensed selenium in liquid form so that it can be circulated. Formation of selenium from hydrogen selenide via the equilibrium $H_2Se \rightleftarrows Se + H_2$ does not take place at a significant rate below 400° C. The temperature used in the cooling step will vary depending upon the pressure, etc., but will generally be between about 220° and 400° C. At temperatures above 400° the equilibrium reaction is sufficiently rapid to cause formation of undesirable amounts of selenium. The liquid selenium which separates in the cooling step can be returned for reuse as a catalyst in the process. If some hydrocarbons in the reaction product also condense at this temperature, which may be the case if high-boiling hydrocarbons are treated, they can be separated by any known method from the liquid selenium. Gravity separation would be most convenient due to the considerable difference in density.

This cooling step prevents deposition of additional selenium either as a result of formation from hydrogen selenide or as a result of lowering of the vapor pressure of selenium by any subsequent cooling during later stages of the process. This minimizes or prevents deposition of solid selenium in the parts of the apparatus following this first cooling step until the second cooling stage is reached. Any small amounts of selenium vapors or mist in the effluent after the first cooling step may be removed by a second cooling to a temperature below the melting point of selenium, i. e., below 217° C. This will cause the selenium to form solid fine particles which can be removed by passing the vapor effluent through a filter. We prefer to employ a solid filter bed made of refractory material such as kieselguhr, pumice or the like. When the filter is saturated with the solid selenium, it may be regenerated by treatment with hydrogen at elevated temperature, such as between 500° and 600° C. This converts the selenium to hydrogen selenide and the so-formed hydrogen selenide can be returned for reuse in the process. After such regeneration the filter can be reused.

The reaction products are then further cooled to separate the liquid products from the normally gaseous products. The liquid products comprising hydrocarbons are fractionated to obtain the desired components and if desired, the unconverted components are recycled. The gaseous products comprise hydrogen selenide, methane, $H_2S$ (when sulfur compounds are present in the hydrocarbon charge) and hydrogen. These gases are fractionated to separate the hydrogen selenide which is recycled. If desired, the hydrogen and hydrocarbon portion may be used to treat the filter to convert the selenium thereon into hydrogen selenide. In the event hydrogen sulfide is present, this gas is washed from the hydrogen and hydrocarbon gases as by washing with aqueous alkali, amines, etc. before the gas is used to treat the filter bed to convert the selenium into hydrogen selenide.

In the accompanying drawing we have illustrated a diagrammatic elevation partly in section of apparatus in which our invention may be carried out. Referring to the drawing, numeral 2 indicates a conduit through which hydrocarbon to be treated is introduced into the reaction system by pump 4. The hydrocarbon charge first passes through heater 6 thence through conduit 8 into reactor 10. The hydrocarbon is substantially vaporized in heater 6 and heated to reaction temperature. As these vapors pass through conduit 8 they are mixed with hydrogen selenide recycled through conduit 12. Selenium vapors are generated in vaporizer 14 and the vapors are introduced into reactor 10 through conduit 16. Liquid selenium which is condensed in reactor 10 is returned to vaporizer 14 through conduit 18. The mixture of hydrocarbon vapors, hydrogen selenide and selenium vapor passes through reactor 10 where the desired reaction takes place.

The reaction products then pass through conduit 20 into cooler 22 where the mixture is cooled to condense liquid selenium which is separated in separator 24. This liquid is returned to vaporizer 14 by way of conduit 26. The remaining reaction products flow through conduit 28 and are cooled at 30. This cooling is sufficient to cause separation of residual selenium vapors in the form of solid particles. The effluent then passes into filter 32 or filter 34 depending upon which filter is on stream and which is being regenerated. Assuming that filter 32 is being regenerated, the reaction products will pass from cooler 30 through valve 36 thence through filter 34 and into conduit 38. Valves 40, 42, 44 and 46 will be closed during such passage whereas valves 36, 48, 50 and 52 will be open. The effluent then flows into cooler 54 and high pressure separator 56 where the liquid hydrocarbons are separated from the gases. The liquid product is withdrawn through valve 58 and treated to recover product therefrom.

The gaseous portion of the reaction products then passes through conduit 60 into fractionating equipment 62 where the gaseous portion is fractionated into its various components. Hydrogen selenide is separated and is removed through conduit 64 and is recycled by way of conduit 66 to pump 68.

While the foregoing operations are taking place, heated hydrogen is passed through valve 52 and filter 32 to convert selenium therein into hydrogen selenide which is recycled through conduit 67. The amount of hydrogen necessary for this operation is small and it is largely consumed in reacting with the selenium. When filter 34 becomes sufficiently saturated with solid selenium to require regeneration, suitable switching of the valves passes the reaction products through filter 32 which will be in regenerated condition. Simultaneously, the other valves are switched so as to pass the heated hydrogen stream through valve 42 and filter 34.

When high-boiling hydrocarbons are treated, the hydrocarbon reaction products may be partially condensed in separator 24. In such an event they may be separated conveniently from the liquid selenium by stratification before the selenium is returned to boiler 14.

Example

Cyclohexane is dehydrogenated in apparatus similar to that illustrated in the drawing by preheating it and then introducing into the reactor at a temperature of about 550° C. and 300 p. s. i. Just previous to introduction into the reactor it is mixed with recycle hydrogen selenide as well as a small amount of hydrogen selenide formed during regeneration of filters employed to remove solid selenium. Selenium vapors are also introduced into the reactor. The fluid taken from the top of the reactor will contain 90 mols of benzene per 100 mols of cyclohexane charged, 10 mols of cyclohexane, 189 mols of hydrogen selenide, 270 mols of hydrogen and 10 mols of selenium calculated as $Se_2$. Cracking may occur to a minor extent and will alter these results somewhat. The effluent is cooled to about 225° C. and introduced into a separator in which the bulk of selenium is removed as liquid. This liquid selenium is returned to the selenium vaporizer. Any liquid selenium separated in the reactor is also returned to the vaporizer. The gases and vapors from the liquid selenium separator are further cooled to about 210° C. and passed through filters containing crushed solid material such as pumice in which the small amount of selenium not recovered in the liquid selenium separator is removed from the gases as a solid. The selenium free gases are then further cooled and introduced into a high pressure separator. The liquid from this unit is fractionated to separate the benzene from the cyclohexane. Hydrogen selenide is separated from the gaseous reaction products and recycled to the reactor. In this example, contact time in the reactor is about 7.6 minutes.

That the selenium and hydrogen selenide appear to act as catalysts is indicated by the fact that they are not consumed in the reaction. For instance, in the above example 189 mols of hydrogen selenide, approximately 3 mols of $Se_6$ and approximately 1 mol of $Se_2$ are separated from the reaction products and recycled to the reactor with fresh charge.

We claim:

1. The process which comprises treating a composition consisting essentially of at least one hydrocarbon selected from the group consisting of paraffinic, naphthenic and mono-olefinic hydrocarbons with a catalyst mixture comprising essentially selenium vapor and hydrogen selenide vapor at a temperature above about 300° C., separating selenium and hydrogen selenide from the reaction products and returning the selenium and hydrogen selenide for reuse in the process.

2. The process for desulfurizing a hydrocarbon which comprises passing vapors of a composition consisting essentially of at least one hydrocarbon selected from the group consisting of paraffinic, naphthenic and mono-olefinic hydrocarbons which contains sulfur compounds together with selenium vapor and hydrogen selenide vapor through a reaction chamber at a temperature above about 300° C., separating selenium from the reaction products and reusing the separated selenium in the process, fractionating the gaseous portion of the reaction products to separate hydrogen selenide from the hydrogen sulfide fraction and recycling the hydrogen selenide for reuse in the process.

3. The process of dehydrogenating a composition consisting essentially of at least one hydrocarbon selected from the group consisting of paraffinic, naphthenic and mono-olefinic hydrocarbons by treating with a mixture of hydrogen selenide and selenium, the total amount of free and combined selenium in said mixture corresponding to approximately one-third mol of selenium for each mol of hydrogen to be removed by dehydrogenation, passing this mixture in vapor form through a reaction chamber at a temperature above about 300° C., separating selenium and hydrogen selenide from the reaction products and recycling the so-separated selenium and hydrogen selenide.

4. The process of dehydrogenating a mixture consisting essentially of hydrocarbons in the gasoline boiling range and including naphthenic hydrocarbons which comprises passing vapors of the hydrocarbon mixture together with vapors of selenium and vapors of hydrogen selenide through a reaction chamber at a temperature between about 350° and 650° C., separating selenium and hydrogen selenide from the reaction products and recycling the selenium and hydrogen selenide for reuse in the process.

5. The process which comprises treating a composition consisting essentially of at least one hydrocarbon selected from the group consisting of paraffinic, naphthenic and mono-olefinic hydrocarbons with a catalyst mixture comprising essentially selenium vapor and hydrogen selenide vapor at a temperature between about 300° and 1000° C., cooling the reaction products to a temperature above the melting point of selenium but below that temperature at which the hydrogen selenide⇌selenium+hydrogen equilibrium is established at a significant rate, separating condensed liquid selenium, returning the separated liquid selenium for reuse in the process, cooling the remaining reaction products to a temperature below the melting point of selenium, separating any solid selenium formed, converting the solid selenium into hydrogen selenide by contacting it with hydrogen at elevated temperature, recycling the so-formed hydrogen selenide, separating hydrogen selenide from the remainder of the reaction products and recycling this separated hydrogen selenide.

6. The process which comprises treating vapors of a composition consisting essentially of at least one hydrocarbon selected from the group consisting of paraffinic, naphthenic and mono-olefinic hydrocarbons with a catalyst mixture comprising essentially selenium vapor and hydrogen selenide vapor at a temperature above about 300° C., cooling the reaction products to a temperature at which liquid selenium is condensed, returning the so-separated liquid selenium for reuse in the process, cooling the remaining reaction products to a temperature below the melting point of selenium, separating solid selenium from the reaction products, converting the solid selenium into hydrogen selenide by contacting it with hydrogen at elevated temperature, recycling the so-formed hydrogen selenide, separating a hydrogen selenide rich stream from the remainder of the reaction products and recycling this separated hydrogen selenide.

7. The process which comprises dehydrogenating a composition consisting essentially of at least one hydrocarbon selected from the group consisting of paraffinic, naphthenic and mono-olefinic hydrocarbons with a catalyst mixture comprising essentially selenium vapor and hydrogen selenide vapor at a temperature between about 350° and 650° C., for a period of between about two seconds and thirty minutes, cooling the reaction products to a temperature of about 220° C., separating condensed liquid selenium, returning the separated liquid selenium for reuse in the process, cooling the remaining reaction products to a temperature below the melting point of selenium, separating any solid selenium formed, converting the solid selenium into hydrogen selenide by contacting it with hydrogen at elevated temperature, recycling the so-formed hydrogen selenide, separating hydrogen selenide from the remainder of the reaction products and recycling this separated hydrogen selenide.

References Cited in the file of this patent

UNITED STATES PATENTS

| | | |
|---|---|---|
| 2,131,089 | Beck | Sept. 27, 1938 |
| 2,161,066 | Laland | June 6, 1939 |
| 2,305,538 | Liedholm | Dec. 15, 1942 |

OTHER REFERENCES

Mazza et al.: "Chem. Abstracts," vol. 23 (1929), col. 2417, abstracted from Rend. Accrd. Sci. Napoli, vol. 33, series 3, (1927) pages 236–9.